United States Patent
Horodezky et al.

(10) Patent No.: US 8,823,749 B2
(45) Date of Patent: Sep. 2, 2014

(54) USER INTERFACE METHODS PROVIDING CONTINUOUS ZOOM FUNCTIONALITY

(75) Inventors: Samuel J. Horodezky, San Diego, CA (US); Kam-Cheong Anthony Tsoi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1041 days.

(21) Appl. No.: 12/482,158

(22) Filed: Jun. 10, 2009

(65) Prior Publication Data

US 2010/0315438 A1   Dec. 16, 2010

(51) Int. Cl.
 G09G 5/00   (2006.01)
 G06F 3/0488   (2013.01)
 G06F 3/0481   (2013.01)

(52) U.S. Cl.
 CPC .......... *G06F 3/04883* (2013.01); *G06F 3/0481* (2013.01); *G06F 2203/04806* (2013.01)
 USPC .......... 345/660; 345/173; 345/619; 345/666; 345/667; 345/668; 345/669; 345/670; 345/671

(58) Field of Classification Search
 None
 See application file for complete search history.

(56) References Cited

U.S. PATENT DOCUMENTS

| | | | |
|---|---|---|---|
| 5,345,543 A | 9/1994 | Capps et al. | |
| 2004/0027395 A1* | 2/2004 | Lection et al. | 345/855 |
| 2006/0227153 A1 | 10/2006 | Anwar et al. | |
| 2006/0232611 A1 | 10/2006 | Brooke | |
| 2007/0037611 A1 | 2/2007 | Mori et al. | |
| 2008/0092081 A1* | 4/2008 | Jong et al. | 715/840 |
| 2008/0238880 A1* | 10/2008 | Miwa | 345/173 |
| 2010/0156806 A1* | 6/2010 | Stallings | 345/173 |

FOREIGN PATENT DOCUMENTS

| | | |
|---|---|---|
| CN | 1845054 A | 10/2006 |
| JP | 2002222034 A | 8/2002 |
| JP | 2004013545 A | 1/2004 |
| JP | 2004070654 A | 3/2004 |
| JP | 2008072673 A | 3/2008 |
| KR | 20090011367 A | 2/2009 |
| WO | 03088176 | 10/2003 |
| WO | WO-2005024616 A1 | 3/2005 |
| WO | 2007149357 | 12/2007 |

OTHER PUBLICATIONS

International Search Report and Written Opinion—PCT/US2010/038207, International Search Authority—European Patent Office—Oct. 7, 2006.

* cited by examiner

*Primary Examiner* — Jwalant Amin
(74) *Attorney, Agent, or Firm* — James T. Hagler

(57) ABSTRACT

Methods and devices provide an efficient user interface for providing continuous zoom or magnification of a displayed image on a computing device. A user may initiate a zoom-in or zoom-out function by tracing an ellipsoidal shape (e.g., a circle) using a user interface device, such as a touchscreen, touchpad or mouse. The zoom function continues so long as a touchscreen or touchpad are touched, or a mouse button is depressed, and an ellipsoidal path is traced. Zoom-in or magnification scaling factor may be applied to an image in response to a clockwise path trace and a zoom-out or demagnification scaling factor may be applied to an image in response to a clockwise path trace, or vice versa. A visual aid may be presented on the display that may be followed to conduct the zoom function.

36 Claims, 13 Drawing Sheets

USER INTERFACE METHODS PROVIDING CONTINUOUS ZOOM FUNCTIONALITY

FIELD OF THE INVENTION

The present invention relates generally to computer user interface systems and more particularly to user systems providing a continuous image zoom function.

BACKGROUND

Personal electronic devices (e.g. cell phones, PDAs, laptops, gaming devices) provide users with increasing functionality and data storage. Personal electronic devices serve as personal organizers, storing documents, photographs, videos and music, and serving as portals to the Internet and electronic mail. In order to fit within the small displays within such devices, documents (e.g., PDF images and photographs) are typically displayed in a scaling viewer that can be controlled by a zoom function. In order to view all or parts on an image, typical user interfaces permit users to adjust a zoom factor by clicking on a zoom icon, entering a magnification value in a data entry window, or dragging a selection box over the portion to be displayed. Another known user interface mechanism for activating the zoom function is the pinch movement of two fingers on a touchscreen display as implemented on the Apple Computer iPhone®. However, such methods for controlling the zooming function can be difficult to manipulate, particularly to accomplish a deep zoom manipulation of the image. This is particularly the case in small portable computing devices whose usefulness depends upon the zooming function given their small screen size. For example, the small size of the Apple iPhone® display limits the degree to which an image can be zoomed in one step using the two finger pinch movement. Additionally, the high cost of the hardware that enables the two finger pinch zoom renders this method unfeasible in lower cost mobile devices.

SUMMARY

Various embodiments provide methods and devices for enabling users of a computing device to continuously adjust a displayed image size in a zoom-in or zoom-out function by tracing a circular or ellipsoidal shape on a touchscreen or with a pointing device, with the image scaling factor controlled by the direction of the movement and number or degrees of rotation. In an embodiment, the computing device receives a series of user pointing events from a user interface such as a touchscreen, touchpad or pointer device (e.g., a stylus) and examines the event data to determine the shape and direction of a path traced in a continuous pointing event. If the traced path is circular or ellipsoidal in shape a zoom function may be initiated in which a scaling factor is applied to an image presented on the display based upon the direction (e.g., clockwise or counterclockwise) and length of the traced path to zoom-in or zoom-out the displayed image. In an embodiment, an ellipsoid-shaped path traced in the clockwise direction is interpreted to imitate a zoom-in function, while an ellipsoid-shapes path traced in the counterclockwise direction is interpreted to initiate a zoom-out function. In an optional embodiment the velocity of the traced path may be interpreted to determine the rate (e.g., percent magnification per unit path length) which a zoom function is implemented.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
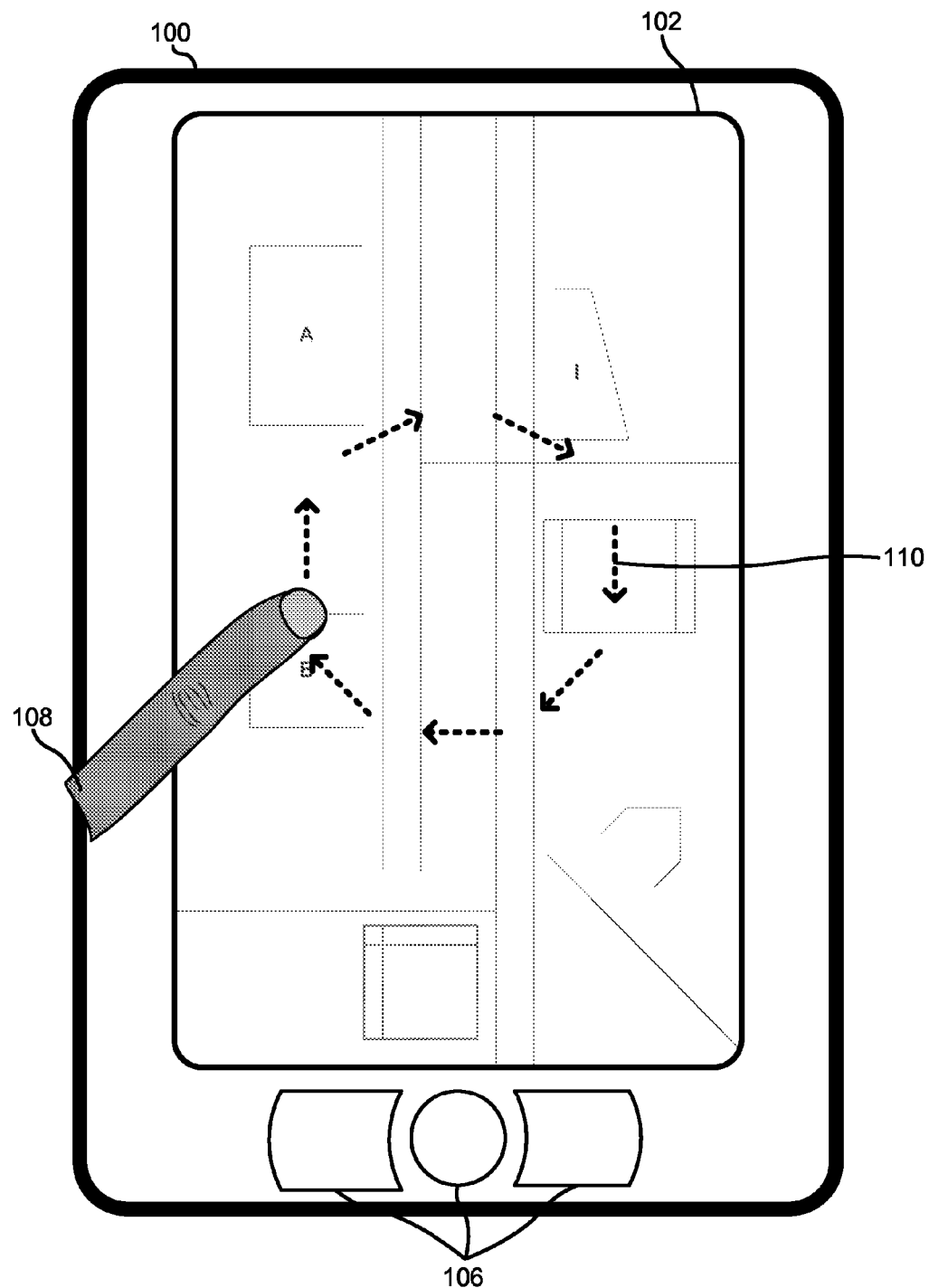
FIGS. 1-3 are frontal views of a portable computing device illustrating zoom-in functionality activated by a finger moving in a clockwise direction on a touchscreen display.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, a "pointing device" refers to any human-computer interface device capable of receiving physical inputs from a user that can be translated into locations and actions such as for use in a graphical user interface (GUI). Common pointing devices include a mouse, touchscreen display that is touched by a finger or stylus, touchpad that is touched by a finger or stylus (as typically employed on some notebook computers), joystick, pointing stick, multi-direction rocker switch (as typically employed on some cellular telephones), trackball mouse, and electronic pen and tablet. Future pointing devices that may be developed and would be encompassed in the various aspects also include large touch sensitive display panels, eye trackers, electronic gloves, and human movement tracking systems. Pointing devices are typically integrated with GUI software to position and control a cursor which appears on the display and moves in conjunction with inputs to the pointing device.

As used herein, the term "cursor" refers to any graphical indicator, such as an arrow or pointing finger icon, that may be displayed in a GUI to aid users in indicating and select items on a GUI display. Typical GUI software is configured to allow a user to navigate a cursor using a pointing device.

As used herein, a "touchscreen" is a touch sensing input device or a touch sensitive input device with an associated image display. As used herein, a "touchpad" is a touch sensing input device without an associated image display. A touchpad, for example, can be implemented on any surface of an electronic device outside the image display area. Touchscreens and touchpads are generically referred to herein as a "touchsurface." Touchsurfaces may be integral parts of an electronic device, such as a touchscreen display, or a separate module, such as a touchpad, which can be coupled to the electronic device by a wired or wireless data link.

As used herein, the terms "personal electronic device," "computing device" and "portable computing device" refer to any one or all of cellular telephones, personal data assistants (PDA's), palm-top computers, notebook computers, personal computers, wireless electronic mail receivers and cellular telephone receivers (e.g., the Blackberry® and Treo® devices), multimedia Internet enabled cellular telephones (e.g., the iPhone®), and similar electronic devices which include a programmable processor, memory and a connected or integral touchsurface or other pointing device (e.g., a computer mouse). In an example embodiment used to illustrate various aspects of the present invention the electronic device is a cellular telephone including an integral touchscreen display. However, this embodiment is present merely as one example implementation of the various embodiments, and as such is not intended to exclude other possible implementations of the subject matter recited in the claims.

As used herein a "touch event" refers to a detected user input on a pointing device which may include information regarding location or relative location (e.g., within a GUI display) of the touch or pointing event. For example, on a touchscreen or touchpad user interface device, a touch event refers to the detection of a user touching the device and may include information regarding the location on the device being touched. As another example, when the pointing device is a computer mouse or trackball, a touch event refers to the depression of a mouse button and may include the location of the cursor within a GUI display when the button is pressed.

As used herein "single continuous touch event" refers to any input received on a user interface device (e.g., touchscreen, touchpad or computer mouse button press) in which the touch event (e.g., touch of touchscreen or touchpad or press of a computer mouse button) continues without significant interruption. Using the example of a touchscreen user interface, a single continuous touch event occurs so long as a user's finger continues to touch the surface. Using the example of a computer mouse user interface, a single continuous touch event occurs so long as the user continues to depress a mouse key (e.g., the left-click button). A single continuous touch event may trace a path on the user interface, however continuous movement is not necessary as a user may trace an ellipsoidal path in one rotational direction (e.g., clockwise), then stop and reverse direction (e.g., counterclockwise).

As used herein the term "path" refers to a sequence of touch event locations that trace a path within a GUI display during a single continuous touch event. Also, as used herein the term "path event" refers to a detected user input on a pointing device which traces a path during a single continuous touch event. A path event may include information regarding the locations or relative locations (e.g., within a GUI display) of the touch events which constitute the traced path.

As used herein the terms "ellipsoid-shape" and "ellipsoidal" refer to any path traced in a single continuous touch event that approximately closes on itself, such as a circle, ellipse, triangle, square, rectangle, or polygon. An "ellipsoid-shape" may be detected before the path closes on itself and may include paths that overlap without closing such as a spiral path traced in a single continuous touch event. A single continuous touch event can be differentiated from other non-continuous touch events such as mouse clicks and taps on a touchscreen such as for selecting items or activating an icon.

The various embodiment methods and devices provide an intuitively easy to use user interface for activating zoom-in to and zoom-out functionality. Users simply trace a path using a pointing device in a single continuous touch event. For example, users may use their fingers to touch and trace a circle on a touchscreen of a portable computing device. The processor of a computing device may be programmed to recognize paths traced in a single continuous touch event as an ellipsoid-shape and, in response, activate the appropriate zoom function. An ellipsoid-shaped path may then be differentiated from other path shapes, such as movement of a finger in one direction on a touchscreen for panning or pinching (e.g., in the case of the iPhone® two finger pinch command for zooming display images).

In the various embodiments the zoom functionality or zoom mode may be enabled automatically. For example, the GUI software may include instructions for automatically recognizing a close-shaped path traced in a single continuous touch event and activating the appropriate zoom functionality. Automatic activation of zoom features may be provided, for example, with applications that display maps and perform GPS location based operations. Also, a GUI may automatically enable the zoom functionality whenever an application displaying scalable content (e.g., a document or image) is activated. In such implementations, certain keys (including both physical and virtual keys) may be automatically assigned to zooming functions.

In some embodiments the zoom functionality or zoom mode may be implemented manually such as may be useful in applications in which zooming is not a primary or common function. To manually enable or activate the zooming function in such applications, a user may select and activate the zoom function by pressing a button or activating an icon on a GUI display. In an exemplary embodiment the zoom activation operation may be assigned to a soft key which the user may activate (e.g., by pressing or clicking) to launch the zoom functionality or zoom mode. In another exemplary embodiment, the zoom functionality may be activated by a user command. For example, the user may use a voice command such as "ACTIVATE ZOOM" to enable the zoom mode. Once activated, the zoom functionality may be used in the manner described below.

Using the continuous zoom functionality a user may control a displayed image to zoom-in or zoom-out beginning a single continuous touch event (e.g., by touching a touchscreen or touchpad or depressing a computer mouse) and tracing a closed shape, such as a circle. According to the various embodiments, the direction and length of the path traced in single continuous touch event controls the zooming functionality. The direction of the path traced in the single continuous touch event is performed may determine the zoom levels (i.e. magnification and reduction of the display image size). For example, to magnify an image, the user may trace a circle in the clockwise direction using a pointing device in a single continuous touch event. Similarly, to reduce the image, the user may trace a circle in the counterclockwise direction using the pointing device with a single continuous touch event. These operations are explained in more detail in the exemplary embodiment below with reference to FIG. 1-9.

The degree to which an image size is changed (i.e., the depth of zoom) depends upon the length of the path traced during the single continuous touch event. Thus, a given image magnification factor may be assigned to a single loop or ellipsoidal path. The more times the closed path is traced, the more times the magnification factor is applied to the image. Further, a fractional magnification factor may be applied to an image for a path traced partially around an ellipsoidal path. Path length may be measured from the starting point of the single continuous touch event (i.e., the GUI location of the first point where the touchscreen or touch pad was touched or the mouse button was depressed). Alternatively, the magnification factor applied may depend upon the number of radians spanned in the ellipsoidal path. In a preferred embodiment the magnification factor is applied to the displayed image continuously so that the image sizes changes continuously as the path is traced. Also in a preferred embodiment, the magnification factor applied to an image is linearly dependent upon the length of the traced path (or radians spanned). Thus, in a preferred embodiment, the faster that a user draws a circle using the user interface, the faster the image changes magnification factor, and when the user stops tracing a path the image remains at the present magnification.

The benefits of the various embodiments are multifold. In particular, users can continuously adjust the zoom until a desired magnification or image size is achieved. This contrasts to known GUI systems in which users must perform zoom operations in steps or increments. For example, the two finger pinch zoom function implemented on the Apple iPhone® can accomplish a limited change in image size before the users' fingers reach the edges of the touchscreen and they must lift their fingers off the touchscreen and reposition them to repeat the operation. This disconnect-and-reconnect action can be especially laborious in smaller devices such as cellular phones or PDAs. In contrast, the various embodiments enable users to zoom an image continuous in or out by trace circles in a single continuous touch event. Users can keep their fingers on the touchscreen (or their finger on a mouse button) for as long as they desire to control the zoom function zooming in and out until the desired size is achieved. Such capabilities are more dynamic compared to the currently available zooming functions and save time and frustration.

The various embodiments may be implemented so that the zoom function is context sensitive such that the availability and applied magnification scaling factor depend upon the nature of the displayed content. For example, the zoom functionality may not be implemented when displayed content is not zoomable (e.g., a menu page) or when the content may involve significant user interactions that might be misinterpreted as ellipsoidal paths (e.g., fillable forms or games). As another example, the scaling factor applied (i.e., the unit magnification factor applied per unit path length) may depend upon the nature and/or size of the displayed content. For example, if the displayed content is a large image (i.e., consisting of a large number of pixels), the unit magnification factor may be increased so that a user can achieve the limit of available magnification within a certain number of loops around an ellipsoidal shape (e.g., within five paths around a circle).

A user may interact with and control the zooming feature of a GUI through the use of any known pointing devices. In a particularly useful application, the pointing device is a touchscreen that is touched by a finger since touchscreens are generally superimposed on a display, enabling users to directly interact with the display image using the touch of a finger. In such application the user interacts with an image by touching the touchscreen with a finger and tracing an elliptical path (thus the user's finger activating the touchscreen serves as the pointing device). Touchscreen touch events acquisition (i.e., detection of a finger touch on a touchscreen) and processing are well known, such as disclosed in U.S. Pat. No. 6,323,846 and U.S. Patent Application Publication No. U.S. 2006/009771, the entire content of both of which are hereby incorporated by reference.

Using pointing devices such as a touchpad, users may indirectly interact with an image on the display of a computing device through the use of a graphical indicator such as a cursor. By moving a finger along the surface of the touchpad, users can move the cursor on the display screen and indirectly interact with the GUI in a single continuous touch event. The use of a conventional computer mouse also allows user to indirectly interact with the GUI through manipulation of a cursor. Thus, by moving the computer mouse while pressing one of the mouse keys, the user may indirectly interact with the GUI in a single continuous touch event.

In a further embodiment, the continuous zoom functionality can be used to control the size of a selected object within a desktop or graphics application. In this embodiment, the user can select an object that can be resized, such as by double clicking or tapping on it, and then trace an elliptical path using the pointing device (e.g., a finger on a touchscreen) in either the clockwise or counterclockwise directions. In response, the GUI adjusts the size of the object proportional to the length of the traced path or number of loops traced in a manner similar to how objects can be resize in a GUI by "grabbing" a corner and dragging it inward or outward.

Figure 3:
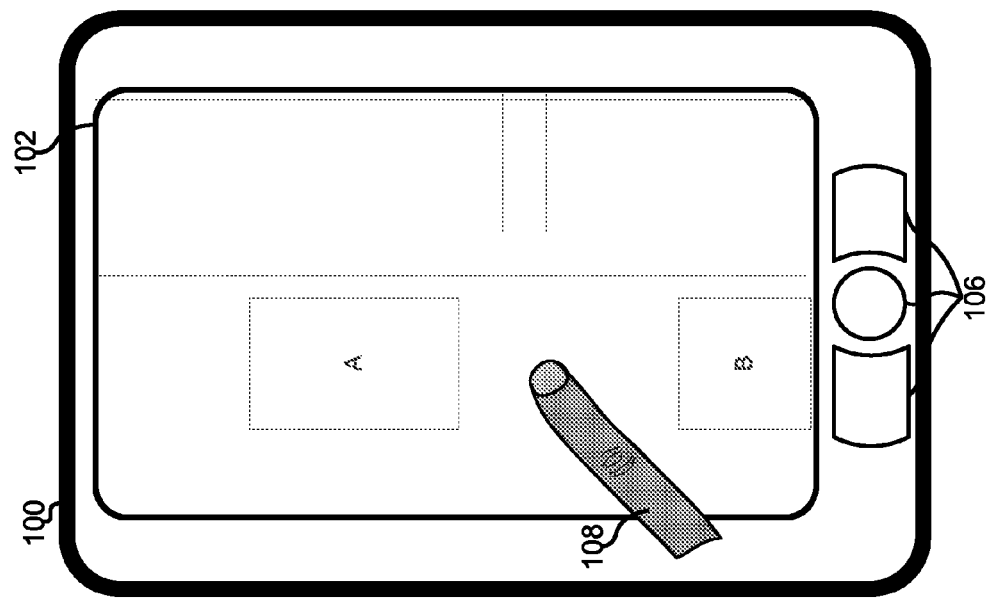
Figure 2:
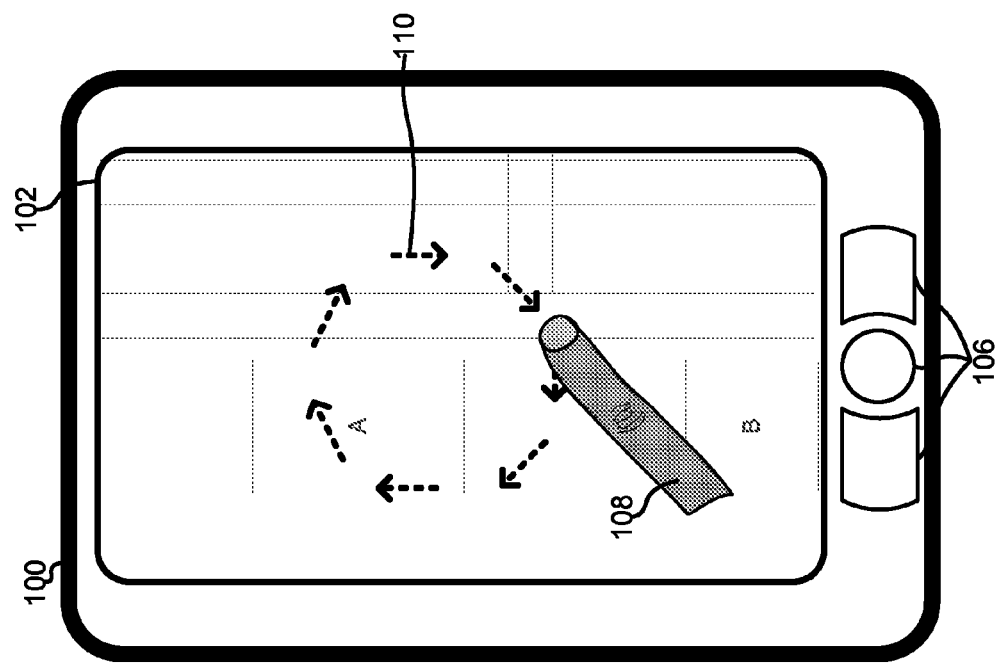
Figure 6:
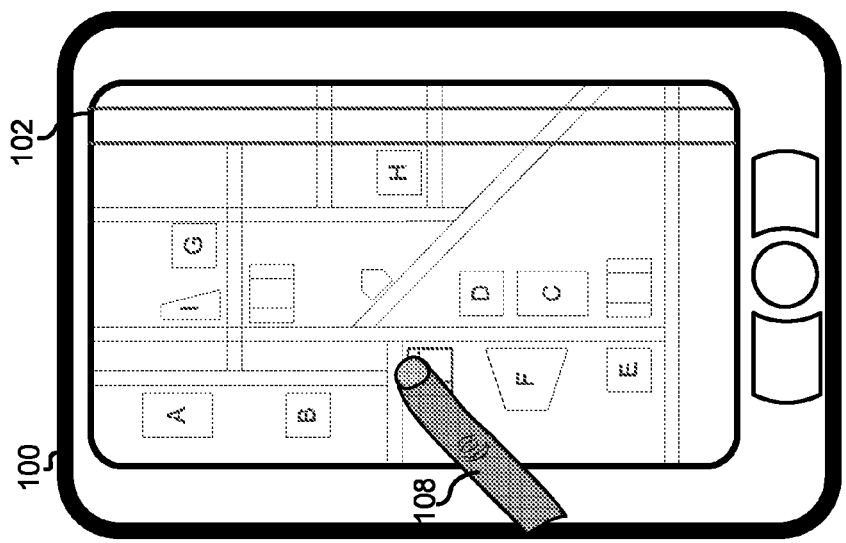
FIGS. 4-6 are frontal views of a portable computing device illustrating zoom-out functionality activated by a finger moving in a counterclockwise direction on a touchscreen display.
Figure 5:
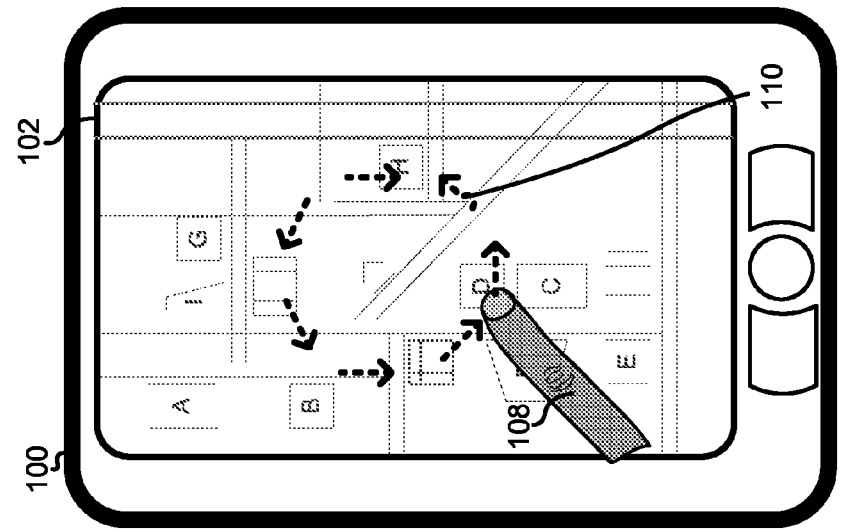
Figure 4:
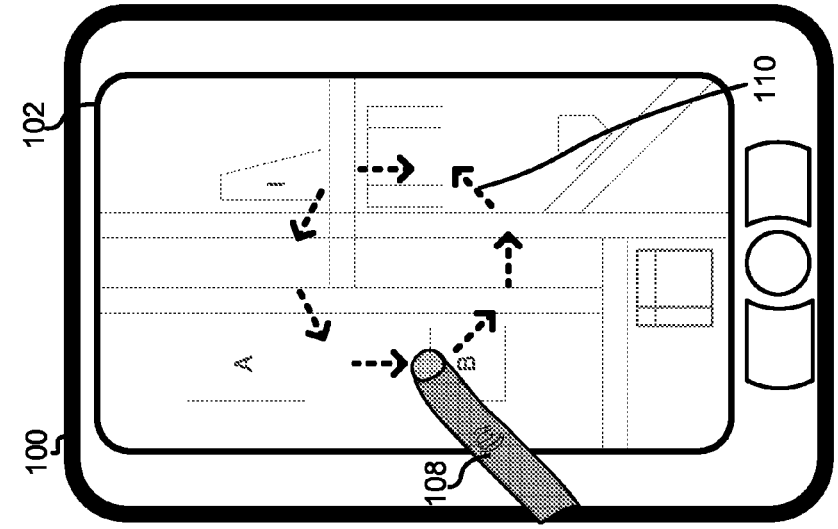

An embodiment for changing the size of an image presented on a display screen by moving a finger on a touchscreen input device according is illustrated in FIGS. 1-6. FIGS. 1-3 illustrate an exemplary method for magnifying the size of the displayed image by tracing a closed path in a clockwise direction. FIGS. 4-6 illustrate an exemplary method for reducing the size of the display image by tracing a closed path in a counterclockwise direction.

Referring to FIG. 1, an example mobile computing device 100 includes a touchscreen display 102 and function keys 106 for interfacing a GUI. In the illustrated example, the computing device 100 is running a map application which displays several streets and buildings on the touchscreen display 102. At the magnification of the image shown in FIG. 1, buildings A, B and I can be viewed on the touchscreen display 102.

A user can zoom in to the image (i.e., magnify the displayed image) by touching the touchscreen 106 with, for example, a finger 108 and moving the finger 108 to trace a closed path (e.g., a circle) in a single continuous touch event (i.e., without raising the finger from the touchscreen display 102). The direction and the general shape of the path that a user may trace are shown by dotted arrows 110. These dotted arrows 110 are shown only to indicate the shape and direction of the finger 108 movement and are not included as part of the display 102 in the embodiment illustrated in FIG. 1. As shown in this figure, the zooming function may be configured to recognize a clockwise ellipsoidal path as indicating a positive zoom (magnification). Therefore, when users trace a circle in a clockwise direction with their finger 108 on the touchscreen display 102 in a single continuous touch event (as shown by the arrows 110) the GUI will interpret the traced path as a command to magnify the displayed map image depending upon the length of the traced path.

FIG. 2 shows a resulting image after a user has traced a clockwise circle in a single continuous touch event on the touchscreen display shown in FIG. 1. In this example, the map image on the touchscreen display 102 has been magnified to a point where Building I is no longer visible on the displayed map image, and Buildings A and B appear enlarged. Magnification of the image may continue as long as the users continue to move their fingers on the touchscreen 104 in the clockwise direction.

As shown in FIG. 3, when a user halts the movement of the finger on a touchscreen or touchpad (or computer mouse) or ends the continuous touch event by lifting a figure from the touchscreen or touchpad (or releasing the mouse button) the zoom function maintains the image magnification at the present setting, leaving the image display as is. Thus, once a user has adjusted the image size or zoom factor to a desired level, the user halts the circular motion or lift their finger 108 off of the touchscreen 102 (or touchpad or computer mouse button). The image then remains at that last magnification or zoom level until the user again executes a continuous zoom operation by establishing a continuous touch event (i.e., touching the touchscreen or touchpad or clicking a mouse button) and tracing a closed path.

Note that FIG. 3 also illustrates how the image may appear when the user stops tracing a path but continues to touch the touchscreen. Doing so stops the zoom function at the present magnification. A user may then continue to zoom in by tracing a circular path in a clockwise direction, or tracing a counterclockwise circular path as described more fully below with reference to FIGS. 4-6.

FIG. 4 illustrates the zoom-out functioning of a computing device 100 with touchscreen display 102 by a user tracing a circular path in the counterclockwise direction. To reduce the magnification applied to a display image (i.e. zoom out) a user can touch the touchscreen 102 using, for example, their finger 108 and, while touching the surface, move it so as to trace a circular or ellipsoidal path in the counterclockwise direction. The dotted arrows 110 show the direction and shape of the movement that the user may make and are not intended to show an image that would be displayed in this embodiment. FIG. 5 shows a resulting image after a user has traced a counterclockwise circle in a single continuous touch event on the touchscreen display 102 shown in FIG. 4. As shown in FIG. 5, the smaller scale (i.e., lower magnification or zoom factor) map image includes streets and buildings that are not apparent on the starting display screen shown in FIG. 4. In FIG. 5, the map image, for example, includes Buildings C, D, E, F, G and H, which were not visible in the image shown in FIG. 4. The zoom function will continue to reduce the magnification applied to the image as long as the user continues to trace a counterclockwise circular path in a single continuous touch event. As shown in FIG. 6, once that finger motion stops or the user removes the finger from the touchscreen 102 (or touchpad) the zoom function freezes at the current magnification.

Figure 7:
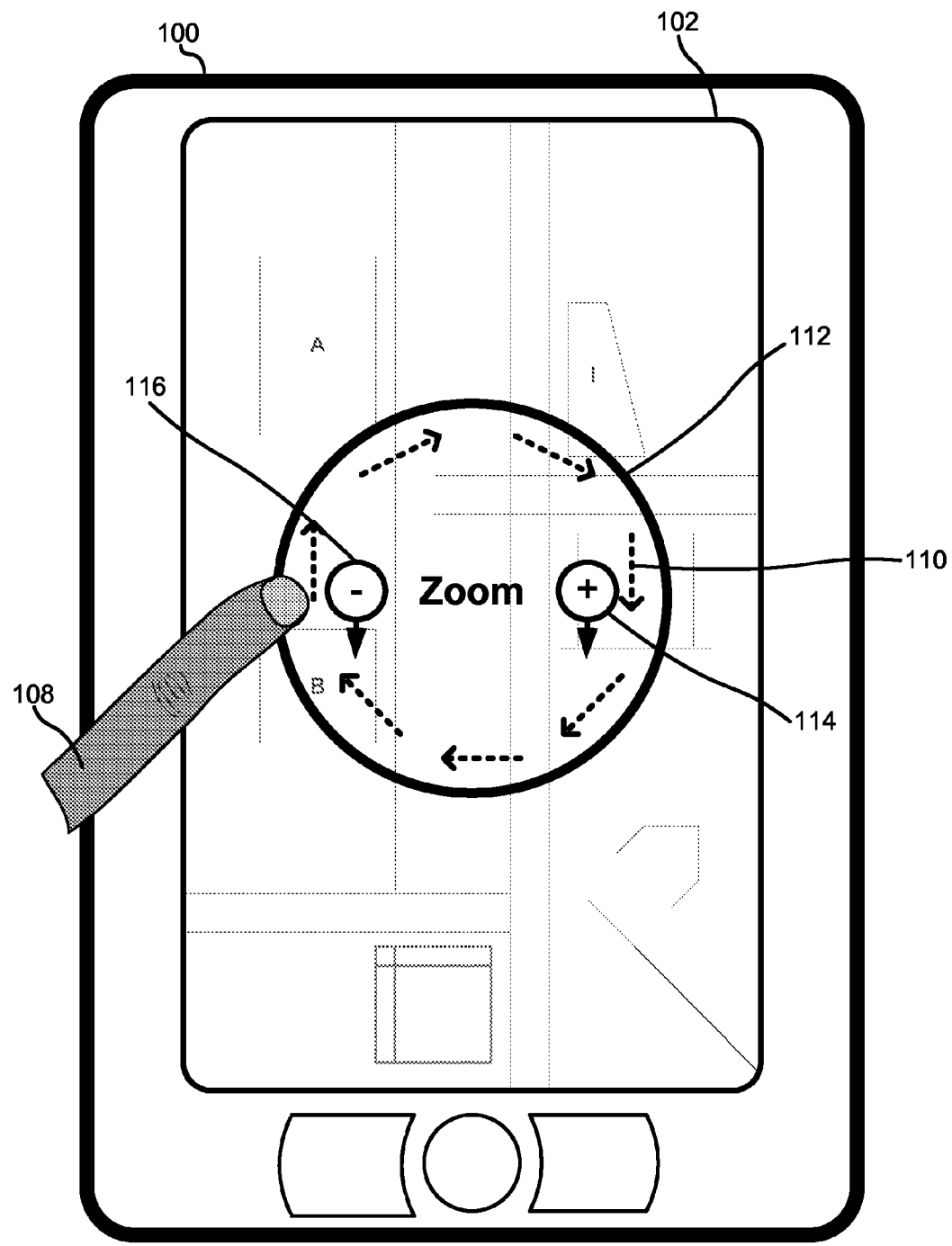
FIGS. 7 and 8 are frontal views of a portable computing device illustrating alternative zoom function display aides that may be presented on a touchscreen display.
Figure 8:
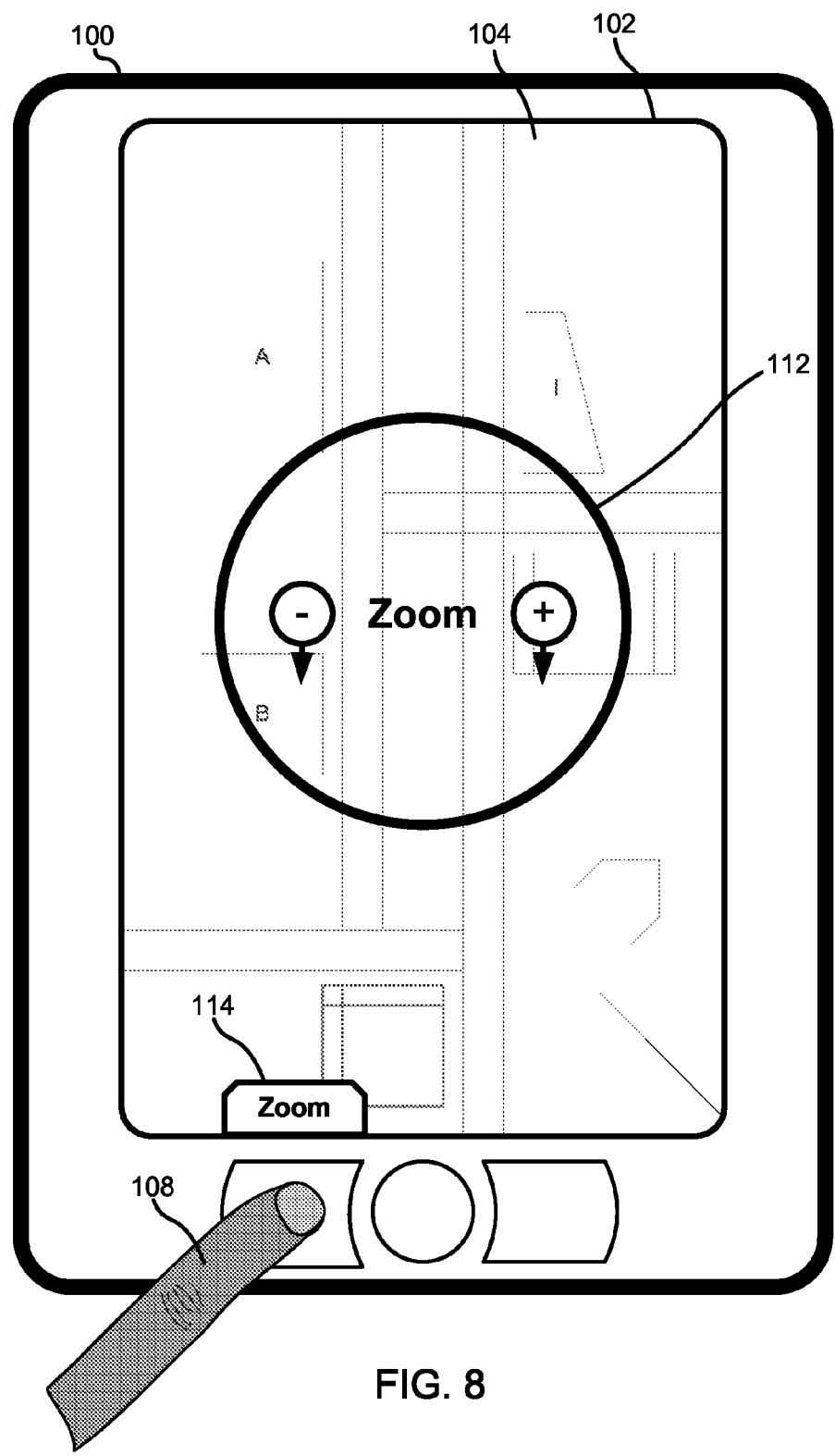

In an alternative embodiment, the zoom function within the GUI may be configured to display a visual aid within the GUI display to assist the user in tracing a closed path. For example, as illustrated in FIG. 7, when the zoom function is activated (e.g., by a button press or detection of a closed path being traced) a zoom wheel 112 may appear on the display 102 to illustrate the shape that the user can trace to change the image magnification. The zoom wheel 112 may include indicators which show the directions to trace to affect increased 114 magnification (i.e., zoom-in) or decreased 116 magnification (i.e., zoom-out).

The GUI may be configured so the zoom wheel 112 is displayed in response a number of different triggers. In one implementation, a zoom wheel 112 may appear on the touchscreen display 102 in response to the touch of the user's finger. In this case, the zoom wheel 112 may appear each time the zoom function is enabled and the user touches the touchscreen display 102. In a second implementation, the zoom wheel 112 may appear in response to the user touching and applying pressure to the touchscreen 102 or a touchpad. In this case, just touching the touchscreen 102 (or a touchpad) and tracing a shape will not cause a zoom wheel 112 to appear, however, the zoom wheel 112 appears if the user touches and presses the touchscreen 102 (or touchpad). In a third implementation illustrated in FIG. 8, a soft key 114 may be designated which when pressed by the user initiates display of the zoom wheel 112. In this case, the user may view the zoom wheel 112 on the touchscreen display 102 by pressing the soft key 114, and then touch the touchscreen to begin tracing the a shape of the zoom wheel 112 in the direction to zoom-in or zoom-out. In a fourth implementation, the zoom wheel 112 may be activated by voice command as in the manner of other voice activated functions that may be implemented on the portable computing device. In this case, when the user's voice command is received and recognized by the portable computing device 100, the zoom wheel 112 is presented on the display 102 to serve as a visual aid or guide for the user.

The zoom wheel 112 implementation description provided above is only one example of visual aids that may be implemented as part of the continuous zoom functionality. As such, these examples are not intended to limit the scope of the present invention. Further, the zoom functionality may be configured to enable users to change the display and other features of the function based on their individual preferences by using known methods. For example, users may turn off the zoom wheel 112 feature or configure the zoom functionality to show a zoom wheel 112 only when the user touches and holds a finger in one place on the touchscreen 104 for a period of time, such as more than 5 seconds.

Figure 9:
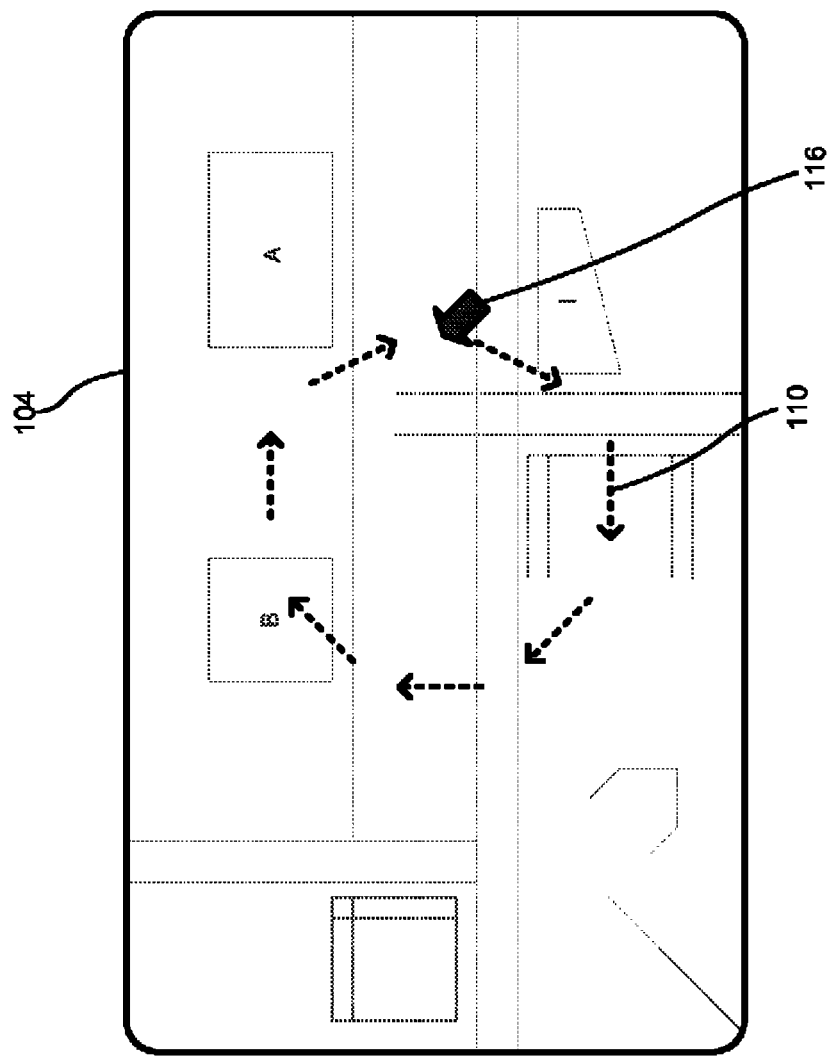
FIG. 9 is an example computer display illustrating use of the continuous zoom function on a person computer using a pointing device.

The continuous zoom functionality may be implemented on a computing device that employs a separate pointing device such as a touchpad or a computer mouse may be used to zoom. A display 104 of such an embodiment is illustrated in FIG. 9. Typical GUI software is configured to use inputs received from pointing devices such as a touchpad or a computer mouse to manipulate a cursor, such as an arrow 116, presented on the display 104 to facilitate the user interactions with the computer. To perform a continuous zoom on such a system, a user may use a pointing device to trace a path 110 with the cursor 116 on the display 104 in a manner similar to that described above for a touchscreen 102. For example, the user may zoom-in on an image by holding down a mouse key and manipulating the mouse to move the cursor 116 in a clockwise direction (as shown by dotted arrows 110) while tracing a closed path. The zoom-in function may continue so long as the cursor is moved and the mouse button is depressed. Similarly, the user may zoom-out on an image by holding down a mouse key and manipulating the mouse to move the cursor 116 in a counterclockwise direction (not shown) while tracing a circle or similar closed path.

In an alternative embodiment (not shown separately), the left and right mouse keys may be used to distinguish between zoom-in and zoom-out functions. For example, in this embodiment a user may zoom-in on an image by clicking the left mouse key and moving the cursor 116 in a closed path, and zoom-out on an image by clicking the right mouse key and moving the cursor 116 in a closed path. Other combinations of motions and keys are also contemplated.

Figure 10:
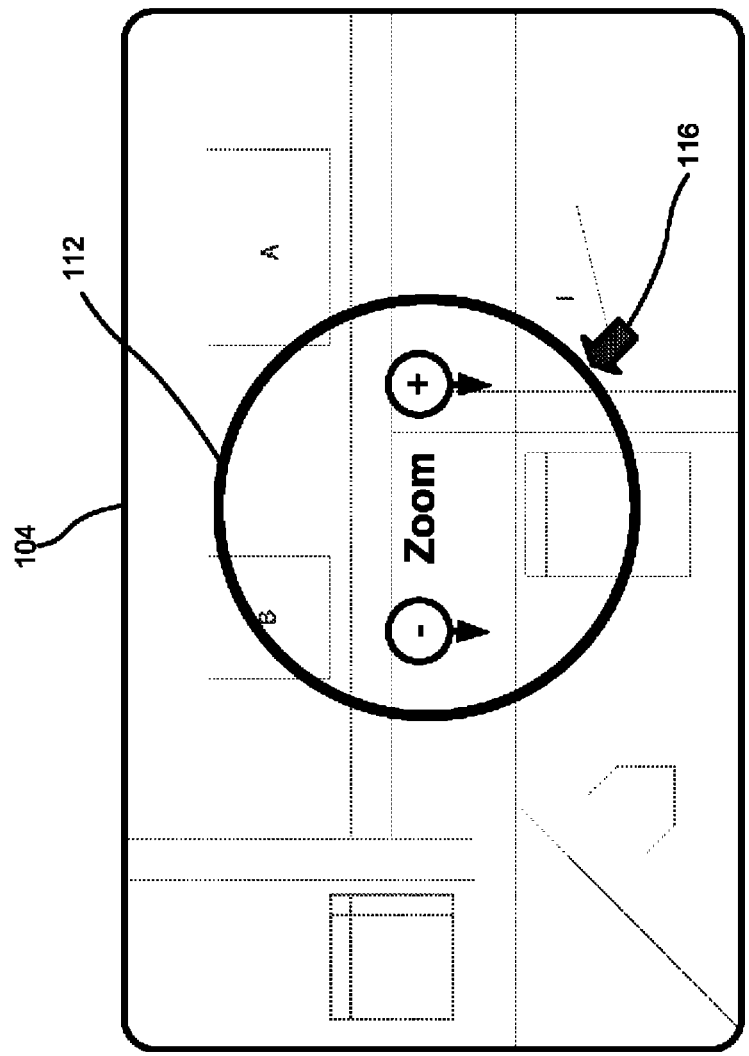
FIG. 10 is an example computer display illustrating a zoom function display aid that may be presented to users.

In a further embodiment illustrated in FIG. 10, a zoom wheel 112 may be presented in a computer display 104 to serve as a visual aid that the user can trace with the cursor 116 to perform the zoom function using a pointing device such as a touchpad or a mouse. In this embodiment, the zoom function software may be configured to display the zoom wheel 112 on the display 104 when a user, for example, presses and holds a touchpad or mouse key.

Figure 11:
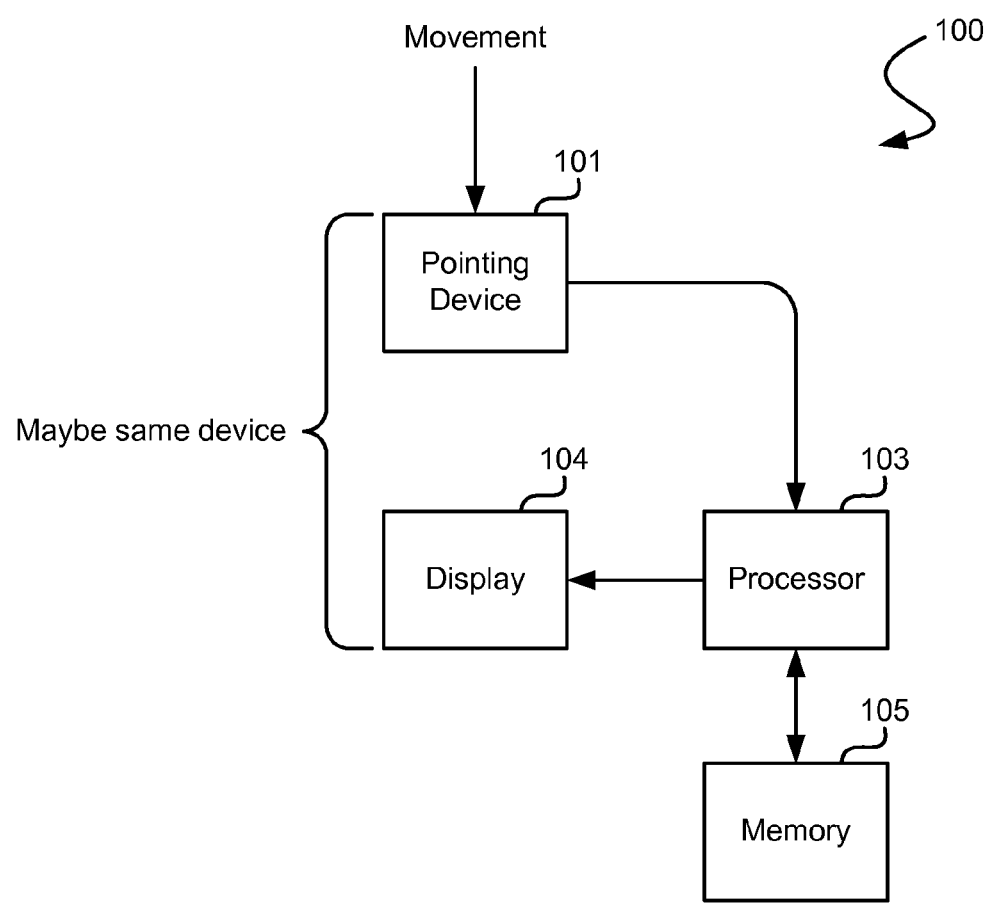
FIG. 11 is a system block diagram of a computer device suitable for use with the various embodiments.

FIG. 11 illustrates a system block diagram of software and/or hardware components of a computing device 100 suitable for use in implementing the various embodiments. The computing device 100 may include a pointing device 101, such as a touchsurface (i.e., touchscreen or touchpad), a display 104, a processor 103 and a memory device 105. In some computing devices 100, the pointing device 101 and the display 102 may be the same device, such as a touchscreen 102. Once a touch event is detected by the pointing device 101, information regarding the position of the touch is provided to the processor 103 on a near continuous basis. The processor 103 may be programmed to receive and process the touch information and recognize a single continuous touch event, such as an uninterrupted stream of touch location information received from the pointing device 101. The processor 103 may also be configured to recognize the path traced during a single continuous touch event by, for example, noting the location of the touch at each instant and movement of the touch location over time. Using such information, the processor 103 can determine the traced path length and direction, and from this information recognize a closed path and calculate a zoom scaling factor based upon the path length. The processor 103 can apply the determined scaling factor to resize the image to be displayed and generate the appropriate image information sent to the display 102. The processor may also be coupled to memory 105 which may be used to store information related touch events, traced paths and image processing data.

Figure 12:
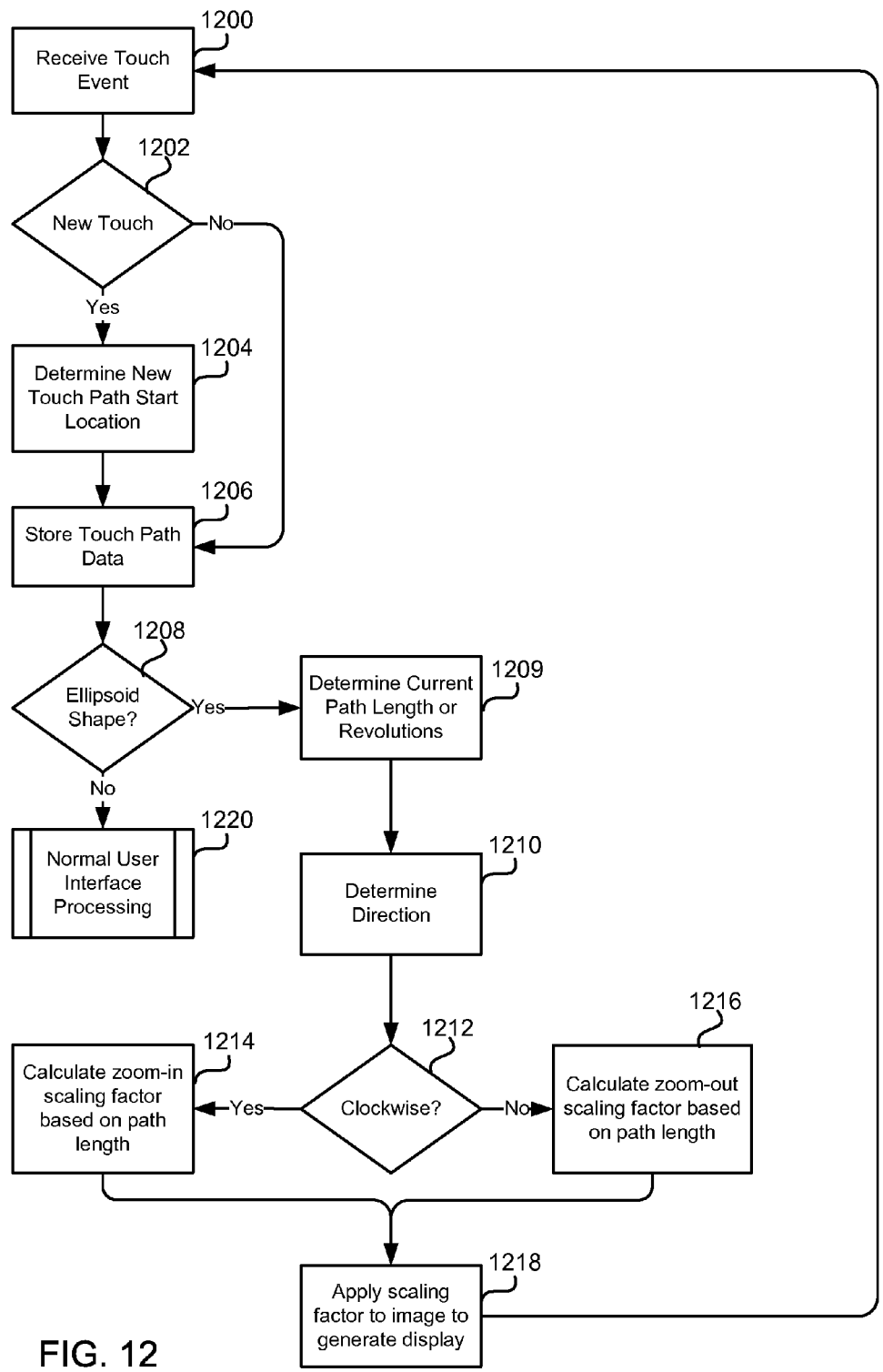
FIG. 12 is a process flow diagram of an embodiment method for implementing a continuous zoom function user interface.

FIG. 12 is a process flow diagram of an embodiment method for implementing the continuous zoom function on a computing device 100 equipped with a touchscreen 102. The processor 103 of a computing device 100 may be programmed to receive touch events, step 1200, from the touchscreen 102, such as in the form of an interrupt or message indicating that the touchscreen 102 is being touched. The processor 103 may then determine whether the touch event is received from a new touch, determination 1202. A new touch will be indicated if in the previous cycle there was no touch event reported by the touchscreen 102. If the received touch event is from a new touch (i.e., determination 1202="Yes"), the processor 103 may be programmed to begin tracking a touch path including determining a new path start location, step 1204. Whether or not the touch event is new, the processor may obtain the touch location information from the touchscreen 102 and store the touch location information in memory as touch path data, step 1206. This operation may involve storing the location of the touch in memory in a data structure that the processor can use to determine a traced path length. The processor 103 may further be programmed to recognize whether the path data follows an ellipsoid shape, step 1208. This operation may be accomplished by analyzing the stored path data using a geometric algorithm to recognize when a path is tracing an ellipsoidal path or has circumscribed the center region of the display. Methods for recognizing an ellipse-type gesture input using a pointing device are disclosed in U.S. Pat. No. 5,590,219, the entire contents of which are hereby incorporated by reference. If the path data is not an ellipsoidal shape (i.e., determination 1208="No"), the processor 103 may continue with normal GUI functions, step 1220, such as image panning or scrolling functions.

If the path data is recognized to be ellipsoidal (i.e., determination 1208="Yes"), the processor 103 may determine the length of the traced path (or the number of revolutions or radian spanned about the display center), step 1209, as well as the direction of the traced touch path, step 1210. These operations may be accomplished by analyzing the stored path data recognize the length and order of the sequence of touch location points along the path. Using the path direction information, the processor 103 may distinguish between a clockwise and a counterclockwise direction, determination 1212. Accordingly, if the direction of the touch path event is clockwise (i.e., determination 1212="Yes"), the processor uses the determined path length (or number of revolutions) to calculate a magnification or zoom-in scaling factor, step 1214. If the touch path data indicate a counterclockwise direction (i.e., determination 1212="No") the processor uses the determined path length (or number of revolutions) to calculate a demagnification or zoom-out scaling factor, step 1216. Once a scaling factor is calculated in steps 1214 or 1216, the factor is applied to the image data in order to generate the display information that is presented on the display 102, step 1218. This process then continues with the next sense and reporting cycle of the touchscreen 102 by returning to step 1200.

Figure 13:
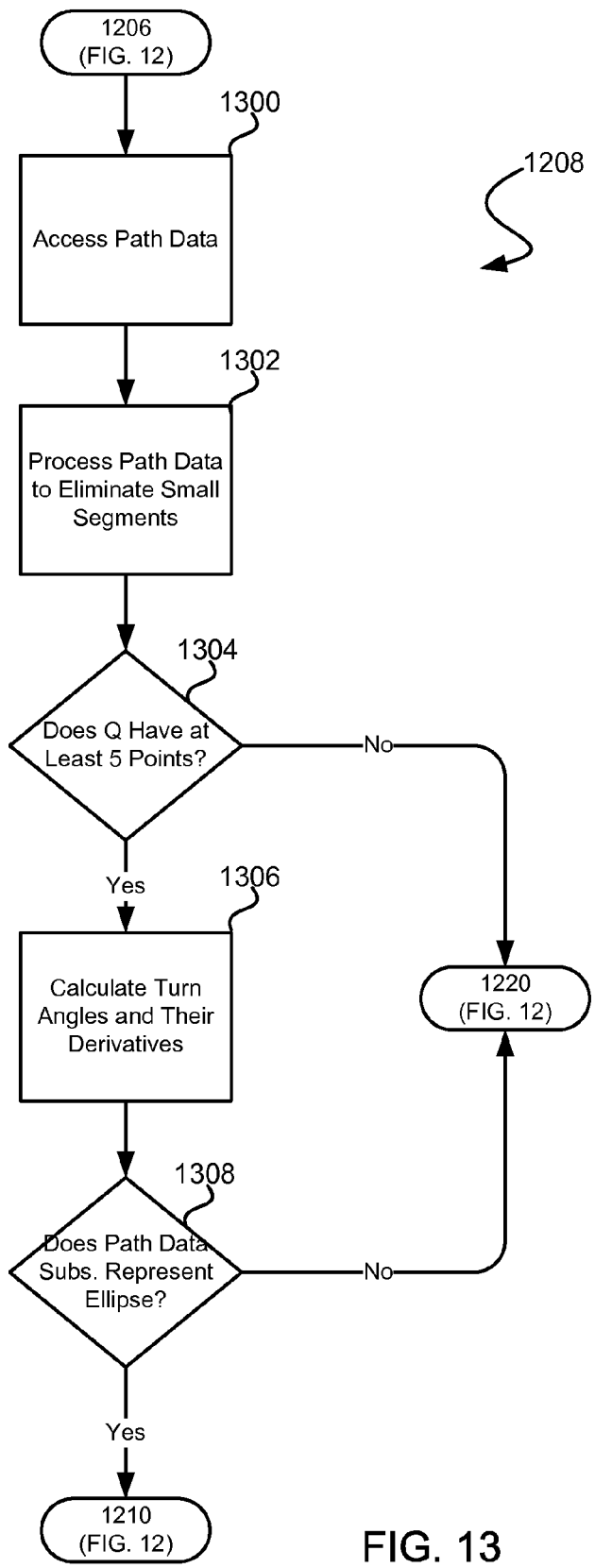
FIG. 13 is a process flow diagram of an embodiment method for determining whether touch data constitutes an ellipsoid shape for implementing the continuous zoom function.

FIG. 13 is a process flow diagram of an embodiment method for implementing the operations included in step 1208 of FIG. 12 for determining whether a traced path is ellipsoidal in shape. The processor may access path data stored in memory, step 1300, and process the data using known methods to eliminate or interpolate among small path segments (i.e. "smooth"), step 1302. Once the small segments have been smoothed, the processor may check to determine whether the smoothed path data includes a series of touch locations Q including at least a minimum number of points, determination 1304, such as a minimum of five points. In alternative embodiments, the minimum number of stroke point array Q may be 3, 10 or more points. If Q does not include the minimum number of touch points (i.e., determination 1304="No"), the path data processing may continue as if the path is not an ellipsoid-type such as with normal GUI processing, step 1220 (FIG. 12). However, if the array Q includes the minimum number of points (i.e., determination 1304="Yes"), the processor may calculate the turn angles and the derivatives of the turn angles of the traced path using the path data stored in memory, step 1306. By using known methods, the processor may then determine whether the path data substantially represents an ellipsoid, determination 1308. If the path data does not substantially represent an ellipsoid (i.e., determination 1308="No") the path data is assumed not to constitute an ellipsoid shape and normal GUI processing may continue, step 1220 (FIG. 12). If the path data substantially represents an ellipsoid shape (i.e., determination 1308="Yes"), the process continues to step 1210 described above with reference to FIG. 12.

Figure 14:
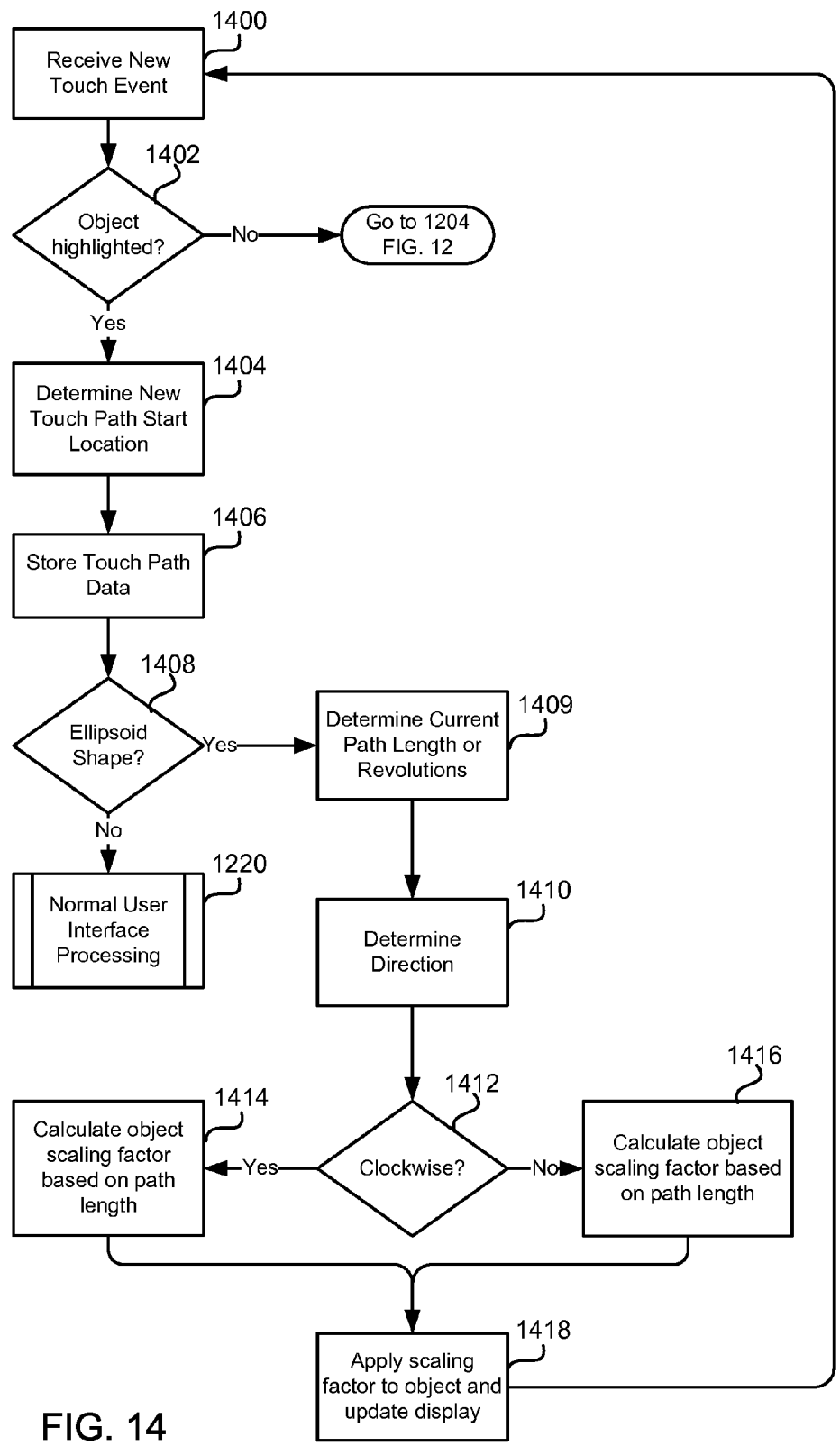
FIG. 14 is a process flow diagram of an embodiment method for implementing an object resizing function activated by a point device tracing an elliptical path.

FIG. 14 is a process flow diagram of an alternative embodiment method for resizing selected objects displayed on a computing device 100 equipped with a touchscreen 102 or other pointing device. As with the previously described embodiments, the processor 103 of a computing device 100 may be programmed to receive and recognize new touch events from the touchscreen 102 , step 1400, such as described above with reference to FIG. 12. The processor 103 may then determine whether an object within the display is presently selected, determination 1402. As is well known, an object may be selected within a GUI by double clicking or double tapping on the object, for example. If an object is not selected(i.e., determination 1402="No"), processing may continue as described above with reference to FIG. 12, such as by proceeding to step 1204. If an object is selected (i.e., determination 1402="Yes"), the processor 103 may be programmed to begin tracking a touch path including determining a new path start location, step 1404. The processor may obtain the touch location information from the touchscreen 102 and store the touch location information in memory as touch path data, step 1406. This operation may involve storing the location of the touch in memory in a data structure that the processor can use to determine a traced path length. The processor 103 may further be programmed to recognize whether the path data follows an ellipsoid shape, step 1408. As described above, this operation may be accomplished by analyzing the stored path data using a geometric algorithm to recognize when a path is tracing an ellipsoidal path or has circumscribed the center region of the display. If the path data is not an ellipsoidal shape (i.e., determination 1408="No"), the processor 103 may continue with normal GUI functions, step 1220, such as object movement functions.

If the path data is recognized to be ellipsoidal (i.e., determination 1408="Yes"), the processor 103 may determine the length of the traced path (or the number of revolutions or radian spanned about the display center), step 1409, as well as the direction of the traced touch path, step 1410. These operations may be accomplished by analyzing the stored path data recognize the length and order of the sequence of touch location points along the path. Using the path direction information, the processor 103 may distinguish between a clockwise and a counterclockwise direction, determination 1412. Accordingly, if the direction of the touch path event is clockwise (i.e., determination 1412="Yes"), the processor uses the determined path length (or number of revolutions) to calculate a positive object scaling factor, step 1414. This object scaling factor is by the GUI to determine how much the selected object should be increased in size. If the touch path data indicate a counterclockwise direction (i.e., determination 1212="No") the processor uses the determined path length (or number of revolutions) to calculate a negative object scaling factor, step 1416. This object scaling factor is by the GUI to determine how much the selected object should be increased in size. Once an object scaling factor is calculated in steps 1414 or 1416, the factor is applied to the selected object to change its size within the application and the new size is used to update the display information that is presented on the display 102, step 1418. This process then continues with the next sense and reporting cycle of the touchscreen 102 by returning to step 1400.

The figures and the foregoing descriptions address an example embodiment in which a clockwise path trace is interpreted as a zoom-in or magnification command and a counterclockwise path trace is interpreted as a zoom-out or demagnification command (or in one embodiment as positive object scaling factor or a negative object scaling factor). However, the invention and the claims encompass an embodiment in which a clockwise path trace is interpreted as a zoom-out or demagnification command and a clockwise path trace is interpreted as a zoom-in or magnification command. Thus, in this alternative embodiment, when the processor detects an ellipsoidal path with a clockwise rotation the processor calculates a demagnification scaling factor that is applied to content (e.g., a document or image) to generate an image on the display, and when the processor detects an ellipsoidal path with a counterclockwise rotation the processor calculates a magnification scaling factor that is applied to content (e.g., a document or image) to generate an image on the display. In a further embodiment, the zoom factor associated with a direction of rotation (i.e., clockwise or counterclockwise) may be selected as a user-selectable option so that the user can determine whether a clockwise rotation results in image magnification (zoom-in) or demagnification (zoom-out).

Figure 15:
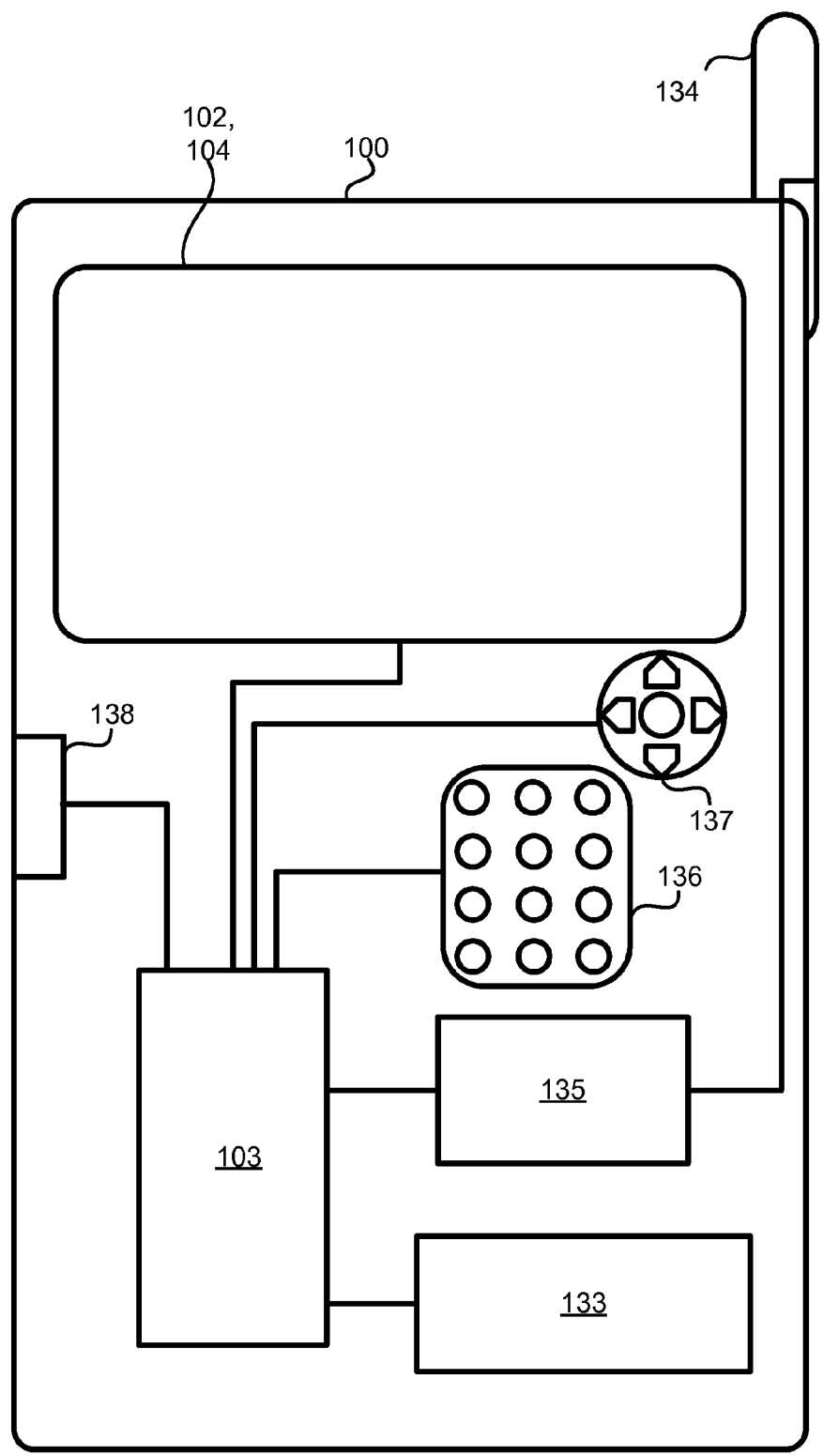
FIG. 15 is a component block diagram of an example portable computing device suitable for use with the various embodiments.

The embodiments described above may be implemented on any of a variety of portable computing devices 100. Typically, such portable computing devices will have in common the components illustrated in FIG. 15. For example, the portable computing devices 100 may include a processor 103 coupled to internal memory 105 and a touchscreen input device 102 or display 102. The touchscreen input device 102 can be any type of touchscreen, such as a resistive-sensing touchscreen, capacitive-sensing touchscreen, infrared sensing touchscreen, acoustic/piezoelectric sensing touchscreen or the like. The various aspects are not limited to any particular type of touchscreen or touchpad technology. Additionally, the portable computing device 100 may have an antenna 134 for sending and receiving electromagnetic radiation that is connected to a wireless data link and/or cellular telephone transceiver 135 coupled to the processor 103. In some implementations, the transceiver 135 and portions of the processor 103 and memory 105 used for cellular telephone communications is referred to as the air interface since it provides a data interface via a wireless data link. Portable computing devices 100 which do not include a touchscreen input device 102 (typically including a display 104) typically include a key pad 136 or miniature keyboard and menu selection keys or rocker switches 137 which serve as pointing devices for receiving user inputs for positioning a cursor within the display 100. The processor 103 may further be connected to a wired network interface 138, such as a universal serial bus (USB) or FireWire® connector socket, for connecting the processor 103 to an external pointing device (e.g., a touchpad or computer mouse) or computing device such as a personal computer 160 or external local area network.

In some implementations, a touchsurface can be provided in areas of the electronic device 100 outside of the touchscreen 102 or display 104. For example, the keypad 136 can include a touchsurface with buried capacitive touch sensors. In other implementations, the keypad 136 may be eliminated so the touchscreen 102 provides the complete GUI. In yet further implementations, a touchsurface may be an external touchpad that can be connected to the electronic device 100 by means of a cable to a cable connector 138 or a wireless transceiver (e.g., transceiver 135) coupled to the processor 103.

The processor 103 may be any programmable microprocessor, microcomputer or multiple processor chip or chips that can be configured by software instructions (applications) to perform a variety of functions, including the functions of the various embodiments described above. In some portable computing devices 100, multiple processors 103 may be provided, such as one processor dedicated to wireless communication functions and one processor dedicated to running other applications. The processor may also be included as part of a communication chipset. Typically, software applications may be stored in the internal memory 105 before they are accessed and loaded into the processor 103. In some portable computing devices 100, the processor 103 may include internal memory sufficient to store the application software instructions. For the purposes of this description, the term memory refers to all memory accessible by the processor 103, including internal memory 105 and memory within the processor 103 itself Application data files are typically stored in the memory 105. In many portable computing devices 100, the memory 105 may be a volatile or nonvolatile memory, such as flash memory, or a mixture of both.

Figure 16:
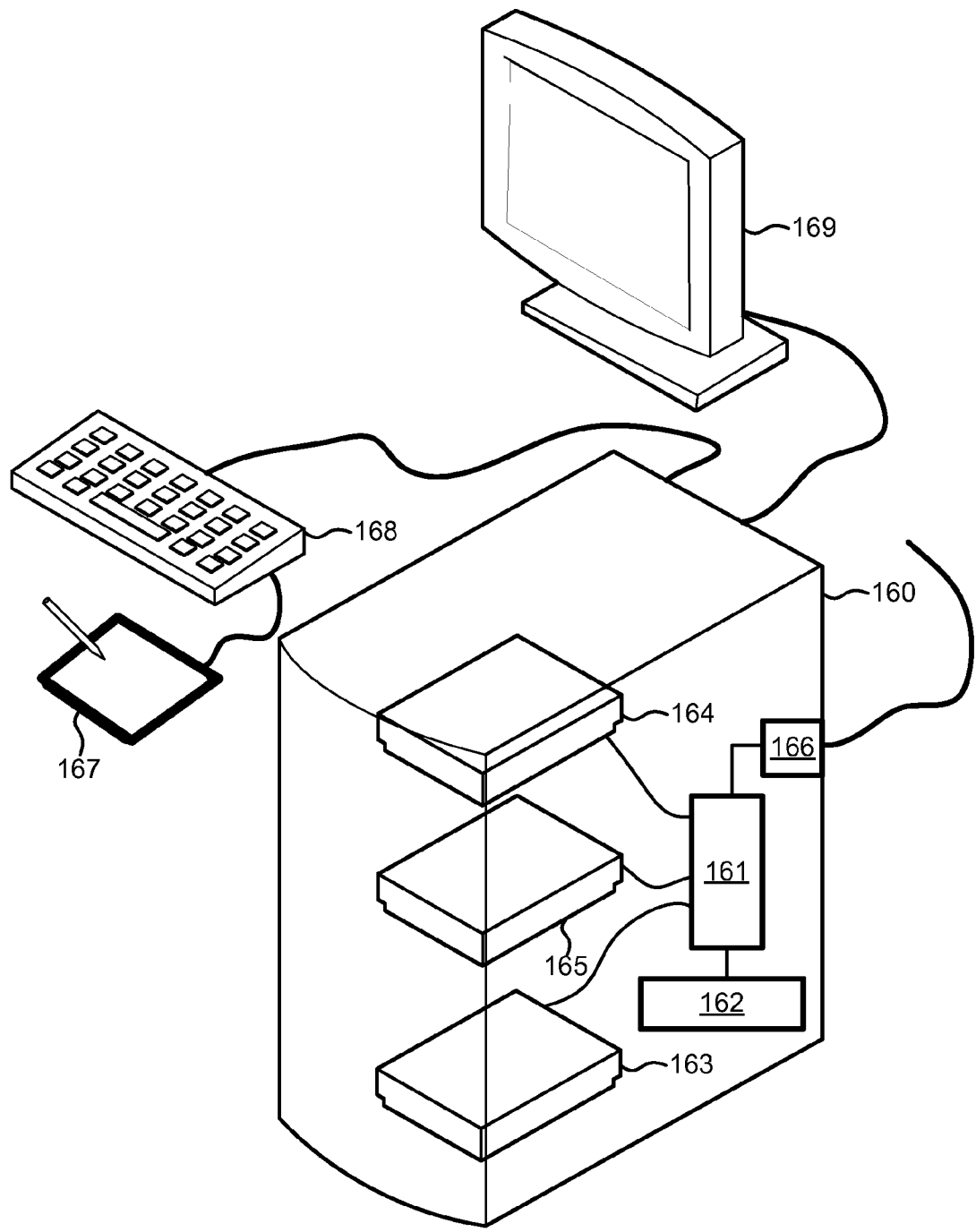
FIG. 16 is a component block diagram of a computer suitable for use with the various embodiments.

The aspects described above may also be implemented on any of a variety of computing devices, such as a personal computer 160 illustrated in FIG. 16. Such a personal computer 160 typically includes a processor 161 coupled to volatile memory 162 and a large capacity nonvolatile memory, such as a disk drive 163. The computer 160 may also include a floppy disc drive 164 and a compact disc (CD) drive 165 coupled to the processor 161. The computer device 160 may also include a touchsurface pointing device such as a touchpad 167, a user input device such as a keyboard 168, and a display 169. The computer device 160 may also include a number of connector ports coupled to the processor 161 for establishing data connections or receiving external memory devices, such as a USB or FireWire® connector sockets or other network connection circuits 166 for coupling the processor 161 to a network. In a notebook configuration, the computer housing includes the touchpad 167, keyboard 168 and the display 169 as is well known in the computer arts.

The various aspects may be implemented by a computer processor 103, 161 executing software instructions configured to implement one or more of the described methods. Such software instructions may be stored in memory 105, 162, 163 as separate applications, or as compiled software implementing an embodiment method. Further, the software instructions may be stored on any form of tangible processor-readable memory, including: a random access memory 105, 162, hard disc memory 163, a floppy disk (readable in a floppy disc drive 164), a compact disc (readable in a CD drive 165), electrically erasable/programmable read only memory (EEPROM), read only memory (such as FLASH memory), and/or a memory module (not shown) plugged into the computing device 100, 160, such as an external memory chip or a USB-connectable external memory (e.g., a "flash drive") plugged into a USB network port 166.

Those of skill in the art would appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the blocks of a method described above and shown in the figures is for example purposes only as the order of some blocks may be changed from that described herein without departing from the spirit and scope of the present invention and the claims.

The blocks of a method or algorithm described in connection with the aspects disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of non-transitory storage medium known in the art. An exemplary non-transitory storage medium is coupled to a processor such that the processor can read information from, and write information to, the non-transitory storage medium. In the alternative, the non-transitory storage medium may be integral to the processor. The processor and the non-transitory storage medium may reside in an ASIC. The ASIC may reside in a user terminal or computing device. In the alternative, the processor and the non-transitory storage medium may reside as discrete components in a user terminal or computing device. Additionally, in some aspects, the blocks and/or actions of a method or algorithm may reside as one or any combination or set of codes and/or instructions on a machine readable medium and/or computer readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein, and instead the claims should be accorded the widest scope consistent with the principles and novel features disclosed herein.

What is claimed is:

1. A method for providing a zoom function for content displayed on a computing device, comprising:
   detecting a path event on a user interface device;
   determining whether the path event traces an ellipsoidal shape;
   determining a length of the path event;
   determining a nature of the displayed content;
   calculating a zoom scaling factor based upon the determined length of the path event and the determined nature of the displayed content;
   determining whether the displayed content is zoomable;
   determining whether the displayed content involves significant user interaction that will be misinterpreted as a path event that traces an ellipsoidal shape;
   using the zoom scaling factor to generate an image on a display in response to determining that the displayed content is zoomable and determining that the displayed content does not involve significant user interaction that will be misinterpreted as a path event that traces an ellipsoidal shape; and
   in response to determining that the displayed content involves significant user interaction that will be misinterpreted as a path event that traces an ellipsoidal shape, the zoom function using the zoom scaling factor is not implemented.

2. The method of claim 1, wherein the processes of calculating a zoom scaling factor and using the zoom scaling factor to generate an image on a display are accomplished only if it is determined that the path event traces an ellipsoidal shape.

3. The method of claim 1, further comprising:
   determining a direction of the path event,
   wherein calculating a zoom scaling factor comprises calculating a magnification factor if the determined direction of the path event is clockwise and calculating a demagnification factor if the determined direction of the path event is counterclockwise.

4. The method of claim 1, further comprising:
   determining a direction of the path event,
   wherein calculating a zoom scaling factor comprises calculating a demagnification factor if the determined direction of the path event is clockwise and calculating a magnification factor if the determined direction of the path event is counterclockwise.

5. The method of claim 1, further comprising:
   determining a direction of the path event,
   wherein calculating a zoom scaling factor comprises calculating either a magnification factor or a demagnification factor depending upon a user-defined setting if the determined direction of the path event is clockwise and calculating a demagnification factor or a magnification factor depending upon the user-defined setting if the determined direction of the path event is counterclockwise.

6. The method of claim 1, wherein the path event comprises receiving a continuous series of touch events from one of a touchscreen and a touchpad.

7. The method of claim 1, wherein the path event comprises receiving a continuous series cursor locations based upon inputs from a pointing device while a button on the pointing device remains depressed.

8. The method of claim 1, further comprising displaying an ellipsoidal shaped visual aid on the display.

9. The method of claim 1, further comprising displaying an ellipsoidal shaped visual aid on the display in response to determining that the path event traces an ellipsoidal shape.

10. The method of claim 1, further comprising displaying an ellipsoidal shaped visual aid on the display in response to a button press event.

11. The method of claim 1, further comprising displaying an ellipsoidal shaped visual aid on the display in response to a press of a touch surface user interface device.

12. A computing device, comprising:
a processor;
a user interface pointing device coupled to the processor;
a memory coupled to the processor; and
a display comprising displayed content coupled to the processor; wherein the processor is configured with processor-executable instructions to perform operations comprising:
 detecting a path event on the user interface pointing device;
 determining whether the path event traces an ellipsoidal shape;
 determining a length of the path event;
 determining a nature of the displayed content;
 calculating a zoom scaling factor based upon the determined length of the path event and the determined nature of the displayed content;
 determining whether the displayed content is zoomable; determining whether the displayed content involves significant user interaction that will be misinterpreted as a path event that traces an ellipsoidal shape;
 using the zoom scaling factor to generate an image on a display in response to determining that the displayed content is zoomable and determining that the displayed content does not involve significant user interaction that will be misinterpreted as a path event that traces an ellipsoidal shape; and
 in response to determining that the displayed content involves significant user interaction that will be misinterpreted as a path event that traces an ellipsoidal shape, a zoom function using the scaling factor is not implemented.

13. The computing device of claim 12, wherein the processor is configured with processor-executable instructions to perform operations such that calculating a zoom scaling factor and using the zoom scaling factor to generate an image on a display are accomplished only if it is determined that the path event traces an ellipsoidal shape.

14. The computing device of claim 12, wherein:
the processor is configured with processor-executable instructions to perform operations further comprising determining a direction of the path event; and
the processor is configured with processor-executable instructions to perform operations such that calculating a zoom scaling factor comprises calculating a magnification factor if the determined direction of the path event is clockwise and calculating a demagnification factor if the determined direction of the path event is counter-clockwise.

15. The computing device of claim 12, wherein:
the processor is configured with processor-executable instructions to perform operations further comprising determining a direction of the path event; and
the processor is configured with processor-executable instructions to perform operations such that calculating a zoom scaling factor comprises calculating a demagnification factor if the determined direction of the path event is clockwise and calculating a magnification factor if the determined direction of the path event is counter-clockwise.

16. The computing device of claim 12, wherein:
the processor is configured with processor-executable instructions to perform operations further comprising determining a direction of the path event; and
the processor is configured with processor-executable instructions to perform operations such that the step of calculating a zoom scaling factor comprises calculating either a magnification factor or a demagnification factor depending upon a user-defined setting if the determined direction of the path event is clockwise and calculating a demagnification factor or a magnification factor depending upon the user-defined setting if the determined direction of the path event is counterclockwise.

17. The computing device of claim 12, wherein the user interface pointing device comprises one of a touchscreen and a touchpad and the processor is configured with processor-executable instructions to perform operations such that the path event is detected based on receiving a continuous series of touch events from the user interface pointing device.

18. The computing device of claim 12, wherein the processor is configured with processor-executable instructions to perform operations such that the path event is detected based on receiving a continuous series cursor locations based upon inputs from a pointing device while a button on the pointing device remains depressed.

19. The computing device of claim 12, wherein the processor is configured with processor-executable instructions to perform operations further comprising displaying an ellipsoidal shaped visual aid on the display.

20. The computing device of claim 12, wherein the processor is configured with processor-executable instructions to perform operations further comprising displaying an ellipsoidal shaped visual aid on the display in response to determining that the path event traces an ellipsoidal shape.

21. The computing device of claim 12, wherein the processor is configured with processor-executable instructions to perform operations further comprising displaying an ellipsoidal shaped visual aid on the display in response to a button press event.

22. The computing device of claim 12, wherein the processor is configured with processor-executable instructions to perform operations further comprising displaying an ellipsoidal shaped visual aid on the display in response to a press of a touch surface user interface device.

23. A non-transitory processor-readable storage medium having stored thereon processor-executable software instructions configured to cause a processor to perform operations for providing a zoom function for content displayed on a computing device, the operations comprising:
 detecting a path event on a user interface device;
 determining whether the path event traces an ellipsoidal shape;
 determining a length of the path event;
 determining a nature of the displayed content;

calculating a zoom scaling factor based upon the determined length of the path event and the determined nature of the displayed content;

determining whether the displayed content is zoomable;

determining whether the displayed content involves significant user interaction that will be misinterpreted as a path event that traces an ellipsoidal shape;

using the zoom scaling factor to generate an image on a display in response to determining that the displayed content is zoomable and determining that the displayed content does not involve significant user interaction that will be misinterpreted as a path event that traces an ellipsoidal shape; and in response to determining that the displayed content involves significant user interaction that will be misinterpreted as a path event that traces an ellipsoidal shape, the zoom function using the zoom scaling factor is not implemented.

24. The non-transitory processor-readable storage medium of claim 23, wherein the stored processor-executable software instructions are configured to cause a processor to perform operations such that calculating a zoom scaling factor and using the zoom scaling factor to generate an image on a display are accomplished only if it is determined that the path event traces an ellipsoidal shape.

25. The non-transitory processor-readable storage medium of claim 23, wherein the stored processor-executable software instructions are configured to cause a processor to perform operations further comprising determining a direction of the path event; and wherein the stored processor-executable software instructions are configured to cause a processor to perform operations such that such that calculating a zoom scaling factor comprises calculating a magnification factor if the determined direction of the path event is clockwise and calculating a demagnification factor if the determined direction of the path event is counterclockwise.

26. The non-transitory processor-readable storage medium of claim 23, wherein the stored processor-executable software instructions are configured to cause a processor to perform operations further comprising determining a direction of the path event; and wherein the stored processor-executable software instructions are configured to cause a processor to perform operations such that calculating a zoom scaling factor comprises calculating a demagnification factor if the determined direction of the path event is clockwise and calculating a magnification factor if the determined direction of the path event is counterclockwise.

27. The non-transitory processor-readable storage medium of claim 23, wherein the stored processor-executable software instructions are configured to cause a processor to perform operations further comprising determining a direction of the path event; and wherein the stored processor-executable software instructions are configured to cause a processor to perform operations such that calculating a zoom scaling factor comprises calculating either a magnification factor or a demagnification factor depending upon a user-defined setting if the determined direction of the path event is clockwise and calculating a demagnification factor or a magnification factor depending upon the user-defined setting if the determined direction of the path event is counterclockwise.

28. The non-transitory processor-readable storage medium of claim 23, wherein the stored processor-executable software instructions are configured to cause a processor to perform operations further comprising detecting the path event based on receiving a continuous series of touch events from one of a touchscreen and a touchpad.

29. The non-transitory processor-readable storage medium of claim 23, wherein the stored processor-executable software instructions are configured to cause a processor to perform operations further comprising detecting the path event based on receiving a continuous series cursor locations based upon inputs from a pointing device while a button on the pointing device remains depressed.

30. The non-transitory processor-readable storage medium of claim 23, wherein the stored processor-executable software instructions are configured to cause a processor to perform operations further comprising displaying an ellipsoidal shaped visual aid on the display.

31. The non-transitory processor-readable storage medium of claim 23, wherein the stored processor-executable software instructions are configured to cause a processor to perform operations further comprising displaying an ellipsoidal shaped visual aid on the display in response to determining that the path event traces an ellipsoidal shape.

32. The non-transitory processor-readable storage medium of claim 23, wherein the stored processor-executable software instructions are configured to cause a processor to perform operations further comprising displaying an ellipsoidal shaped visual aid on the display in response to a button press event.

33. The non-transitory processor-readable storage medium of claim 23, wherein the stored processor-executable software instructions are configured to cause a processor to perform operations further comprising displaying an ellipsoidal shaped visual aid on the display in response to a press of a touch surface user interface device.

34. A method for resizing an object displayed on a computing device, comprising:

detecting a path event on a user interface device;

determining whether an object is selected;

determining whether the path event traces an ellipsoidal shape;

determining a length of the path event;

determining a nature of the selected object;

calculating an object scaling factor based upon the determined length of the path event and the determined nature of the selected object;

determining whether the selected object is zoomable;

determining whether the selected object involves significant user interaction that will be misinterpreted as a path event that traces an ellipsoidal shape;

resizing the selected object based on the object scaling factor in response to determining that the selected object is zoomable and determining that the selected object does not involve significant user interaction that will be misinterpreted as a path event that traces an ellipsoidal shape; and in response to determining that the selected object involves significant user interaction that will be misinterpreted as a path event that traces an ellipsoidal shape, resizing of the selected object is not performed.

35. A computing device, comprising:

a processor;

a user interface pointing device coupled to the processor;

a memory coupled to the processor; and a display coupled to the processor;

wherein the processor is configured with processor-executable instructions to perform operations comprising:

detecting a path event on the user interface pointing device;
determining whether an object is selected;
determining whether the path event traces an ellipsoidal shape;
determining a length of the path event;
determining a nature of the selected object;
calculating an object scaling factor based upon the determined length of the path event and the determined nature of the selected object;
determining whether the selected object is zoomable;
determining whether the selected object involves significant user interaction that will be misinterpreted as a path event that traces an ellipsoidal shape;
resizing the selected object based on the object scaling factor in response to determining that the selected object is zoomable and determining that the selected object does not involve significant user interaction that will be misinterpreted as a path event that traces an ellipsoidal shape; and
in response to determining that the selected object involves significant user interaction that will be misinterpreted as a path event that traces an ellipsoidal shape, resizing of the selected object is not performed.

36. A non-transitory processor-readable storage medium having stored thereon processor-executable software instructions configured to cause a processor to perform operations for resizing an object displayed on a computing device, the operations comprising:
  detecting a path event on a user interface device;
  determining whether an object is selected;
  determining whether the path event traces an ellipsoidal shape;
  determining a length of the path event;
  determining a nature of the selected object;
  calculating an object scaling factor based upon the determined length of the path event and the determined nature of the selected object;
  determining whether the selected object is zoomable;
  determining whether the selected object involves significant user interaction that will be misinterpreted as a path event that traces an ellipsoidal shape;
  resizing the selected object based on the object scaling factor in response to determining that the selected object is zoomable and determining that the selected object does not involve significant user interaction that will be misinterpreted as a path event that traces an ellipsoidal shape; and
  in response to determining that the selected object involves significant user interaction that will be misinterpreted as a path event that traces an ellipsoidal shape, resizing of the selected object is not performed.

* * * * *